US012729115B2

(12) United States Patent
Seo et al.

(10) Patent No.: US 12,729,115 B2
(45) Date of Patent: Sep. 8, 2026

(54) DEHYDROGENATION METHOD AND HYDROGEN PRODUCTION SYSTEM USING THE SAME

(71) Applicants: HYUNDAI MOTOR COMPANY, Seoul (KR); KIA CORPORATION, Seoul (KR); KOREA RESEARCH INSTITUTE OF CHEMICAL TECHNOLOGY, Daejeon (KR)

(72) Inventors: Jihui Seo, Ulsan (KR); Jaeyong Lee, Seongnam-si (KR); Pyung Soon Kim, Suwon-si (KR); Jin Woo Choung, Suwon-si (KR); Yongwoo Kim, Gunpo-si (KR); Soo Min Kim, Daejeon (KR); Kwanyong Jeong, Daejeon (KR); Jeong Jae Lee, Daejeon (KR); Ji Hoon Park, Daejeon (KR)

(73) Assignees: HYUNDAI MOTOR COMPANY, Seoul (KR); KIA CORPORATION, Seoul (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 832 days.

(21) Appl. No.: 17/985,429

(22) Filed: Nov. 11, 2022

(65) Prior Publication Data

US 2023/0348266 A1 Nov. 2, 2023

(30) Foreign Application Priority Data

Apr. 29, 2022 (KR) ........................ 10-2022-0053230

(51) Int. Cl.
*C01B 3/326* (2026.01)

(52) U.S. Cl.
CPC ........ *C01B 3/326* (2013.01); *C01B 2203/066* (2013.01); *C01B 2203/1082* (2013.01);
(Continued)

(58) Field of Classification Search
CPC ..................................................... C01B 3/326
See application file for complete search history.

(56) References Cited

U.S. PATENT DOCUMENTS 12,312,240 B2 5/2025 Milstein et al.
2022/0024758 A1 1/2022 Milstein et al.

FOREIGN PATENT DOCUMENTS

CN 113396126 A 9/2021
KR 102249231 B1 10/2020
KR 20210113677 A 9/2021

OTHER PUBLICATIONS

Bathula et al "Dehydrogenation of 1-[(n-methylcyclohexyl) methyl] piperidine over mesoporous Pd-Al2O3 catalysts prepared by solvent deficient precipitation: influence of calcination conditions" Catalysts 2019, 9, 719. (Year: 2019).*

(Continued)

*Primary Examiner* — Paul A Wartalowicz
(74) *Attorney, Agent, or Firm* — Lempia Summerfield Katz LLC

(57) ABSTRACT

A dehydrogenation method is provided that includes subjecting a first hydrogen storage body including compound including two or more N-heterocycloalkyl groups, and second hydrogen storage body including a compound including a substituted or unsubstituted cycloalkyl group and an N-heterocycloalkyl group, to a dehydrogenation reaction in the presence of a catalyst to produce hydrogen.

13 Claims, 5 Drawing Sheets

(52) U.S. Cl.
CPC ................ *C01B 2203/1211* (2013.01); *C01B 2203/1614* (2013.01); *C01B 2203/1628* (2013.01); *C01B 2203/80* (2013.01)

(56) References Cited

OTHER PUBLICATIONS

Wang et al. "Homogenous dehydrogenation of liquid organic hydrogen carriers catalyzed by an iridium PCP complex." Faraday Dicsuss. 2011, 151, 297-305. (Year: 2011).*

Yeonsu Kwak et al., Hydrogen production from homocyclic liquid organic hydrogen carriers (LOHCs): Benchmarking studies and energy-economic analyses, Energy Conversion and Management 239 (2021) 114124, Apr. 2, 2021, a href="https://doi.org/10.1016/j.enconman.2021.114124" target="_blank"https://doi.org/10.1016/j.enconman.2021.114124/aa href="https://doi.org/10.1016/j.apenergy.2019.113331;" target="_blank";/a 12 pp.

H. Jorschick et al., Benzyltoluene/dibenzyltoulene-based mixtures as suitable liquid organic hydrogen carrier systems for low temeperature applications, International Journal of Hydrogen Energy, vol. 45, Issue 29, 2020, https://doi.org/10.1016/j.ijhydene.2020.03.210. 10 pp.

* cited by examiner

DEHYDROGENATION METHOD AND HYDROGEN PRODUCTION SYSTEM USING THE SAME

CROSS-REFERENCE TO RELATED APPLICATION

This application claims priority to and the benefit of Korean Patent Application No. 10-2022-0053230 filed in the Korean Intellectual Property Office on Apr. 29, 2022, the entire contents of which are incorporated herein by reference.

BACKGROUND

(a) Field

The present disclosure relates to a dehydrogenation method for producing hydrogen by dehydrogenating a chemical hydride, for example, a liquid organic hydrogen carrier (LOHC), and a hydrogen production system using the same.

(b) Description of the Related Art

Due to depletion of fossil energy and environmental pollution problems, there is a great demand for renewable and alternative energy, and hydrogen is attracting attention as one of such alternative energies.

A fuel cell and a hydrogen burner use hydrogen as a reaction gas, and in order to apply the fuel cell and the hydrogen burner to vehicles and various electronic products for example, a stable and continuous supply technology of hydrogen is required.

In order to supply hydrogen to a device that uses hydrogen, a method of receiving hydrogen whenever hydrogen is needed from a separately installed hydrogen supply source may be used. In this way, compressed hydrogen or liquid hydrogen may be used for hydrogen storage.

Alternatively, a method of generating hydrogen through a reaction of a corresponding material after mounting a material in which hydrogen is stored and produced on a device using hydrogen and supplying it to the device using hydrogen may be used. For this method, for example, a method of using a liquid organic hydrogen carrier (LOHC), a method of using adsorption and desorption (absorbents/carbon), a chemical method (chemical hydrogen storage), and the like have been proposed.

The liquid organic hydrogen carrier (LOHC) may repeat storage and release of hydrogen through hydrogenation, which is an exothermic reaction, and dehydrogenation, which is an endothermic reaction. Herein, the higher the hydrogen storage is higher and the lower the dehydrogenation reaction temperature, the higher the hydrogen storage efficiency of the liquid organic hydrogen carrier.

However, methylcyclohexane (MCH), the most commercially available liquid organic hydrogen carrier, has a high dehydrogenation reaction temperature of 334° C. as well as a low hydrogen storage of 47.4 g/L, which leads to deteriorate energy efficiency by 28.5%, even if the reaction enthalpy alone is considered.

SUMMARY

One aspect provides a dehydrogenation method that improves energy efficiency and energy storage density, while also facilitating discharge of by-products.

According to one aspect, a dehydrogenation method includes subjecting a first hydrogen storage body including a compound including two or more N-heterocycloalkyl groups, and a second hydrogen storage body including a compound including a substituted or unsubstituted cycloalkyl group and an N-heterocycloalkyl group, to a dehydrogenation reaction in the presence of a catalyst to produce hydrogen.

The N-heterocycloalkyl group may be a piperidine group, and the cycloalkyl group may be a cyclohexyl group.

The first hydrogen storage body may include bipiperidine.

The second hydrogen storage body may include cyclohexyl piperidine, methylcyclohexyl piperidine, [(methylcyclohexyl)methyl]piperidine, methyl decahydroquinoline, or a mixture thereof.

The first hydrogen storage body and the second hydrogen storage body may be mixed in a mole ratio in a range of 1:0.5 to 1:2.

The catalyst may include a carrier and an active metal supported on the carrier.

The active metal may include Pd, Pt, Ru, Sn, Mn, Zn, Mg, V, Ce, La, Y, Sm, Gd, Na, K, Cs, Rb, Ni, Rh, Ir, Co, Fe, Cr, Cu, or a mixture thereof.

The active metal may be included in an amount in a range of 0.1 wt. % to 10 wt. % based on the total weight of the catalyst.

The catalyst may further include an additional metal other than the active metal in an amount in a range of 1 wt. % to 20 wt. % based on the total weight of the catalyst.

The carrier may include $Al_2O_3$, $CeO_2$, $SiO_2$, $TiO_2$, $SnO_2$, $Ta_2O_5$, $HfO_2$, $V_2O_5$, $Fe_2O_3$, $Cr_2O_3$, $MoO_3$, ZnO, $Pr_2O_3$, MgO, $ZrO_2$, $La_2O_3$, $WO_3$, carbon, or a mixture thereof.

A mixture of a first by-product produced by dehydrogenating the first hydrogen storage body and a second by-product produced by dehydrogenating the second hydrogen storage body may be in a liquid state.

The first by-product may be dissolved in the second by-product in a liquid state.

The first by-product may include bipyridine.

The second by-product may include phenylpyridine, tolylpyridine, methylquinoline, (tolylmethyl)pyridine, or a mixture thereof.

The dehydrogenation reaction may be performed at a temperature in a range of 200° C. to 300° C. and at a pressure in a range of 1 bar to 5 bars.

According to another aspect, a hydrogen production system may include a first hydrogen storage body supply unit configured to supply a first hydrogen storage body including compound including two or more N-heterocycloalkyl groups. The system may further include a second hydrogen storage body supply unit configured to supply a second hydrogen storage body including a compound including a substituted or unsubstituted cycloalkyl group and an N-heterocycloalkyl group. The system may further include a dehydrogenation reaction unit including a catalyst.

The dehydrogenation reaction unit may be configured to receive the first hydrogen storage body from the first hydrogen storage body supply unit, receive the second hydrogen storage body from the second hydrogen storage body supply unit, and perform a dehydrogenation reaction in the presence of a catalyst to produce hydrogen.

The hydrogen production system may further include a by-product storage unit configured to store a mixture in a liquid state of a first by-product produced by dehydrogenating the first hydrogen storage body and a second by-product produced by dehydrogenating the second hydrogen storage body, which are discharged from the dehydrogenation reaction unit.

The hydrogen production system may further include a buffer tank configured to store hydrogen produced from the dehydrogenation reaction unit.

The hydrogen production system may further include a fuel cell stack configured to generate electricity and water by receiving hydrogen produced in the dehydrogenation reaction unit and oxygen.

The dehydrogenation method, according to one aspect, enables rapid hydrogen extraction even at a low temperature of 270° C. or less and has a high hydrogen storage capacity of 7.0 wt. % or more, thereby improving energy efficiency and energy storage density, while by solving the problem that by-products are converted to a solid state, it is easy to discharge by-products.

DETAILED DESCRIPTION

Figure 1:
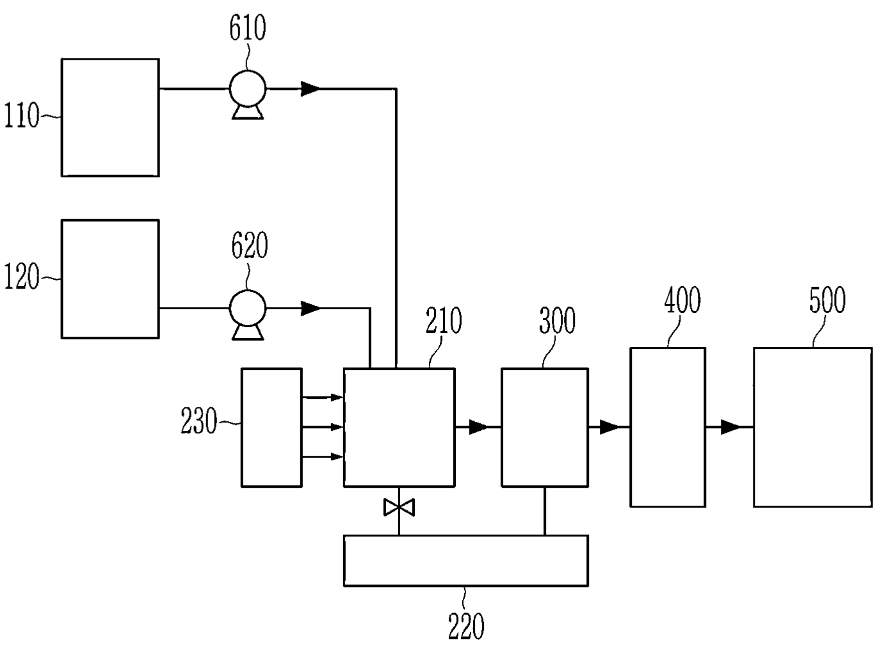
FIG. 1 is a view schematically illustrating a hydrogen production system according to one aspect.

The advantages, features, and aspects to be described hereinafter become apparent from the following description of the embodiments. The present disclosure may be not limited to embodiments that are described herein. Although not specifically defined, all of the terms including the technical and scientific terms used herein have meanings understood by ordinary persons skilled in the art. The terms have specific meanings coinciding with related technical references and the present specification as well as lexical meanings. That is, the terms are not to be construed as having idealized or formal meanings.

Throughout the specification and claims which follow, unless explicitly described to the contrary, the words "comprise" or "include" or variations such as "comprises," "includes," "comprising," or "including" will be understood to imply the inclusion of stated elements but not the exclusion or any other elements. The terms of a singular form may include plural forms unless referred to the contrary.

The dehydrogenation method according to one aspect generates hydrogen by dehydrogenating a mixture of the first hydrogen storage body and the second hydrogen storage body in the presence of a catalyst.

The first hydrogen storage body includes a compound including two or more N-heterocycloalkyl groups.

For example, the N-heterocycloalkyl group may be a piperidine group. In this case, the compound including two or more N-heterocycloalkyl groups may be a bipiperidine such as 2,2-bipiperidine or 4,4-bipiperidine.

For example, the first hydrogen storage body may further include a piperidine-based compound substituted with one or more alkyl groups. For example, the piperidine-based compound substituted with one or more alkyl groups may be 2-methylpiperidine, 3-methylpiperidine, 4-methylpiperidine, 3,4-dimethylpiperidine, 2,4-dimethylpiperidine, 2,5-dimethylpiperidine, 2,6-dimethylpiperidine, 3,5-dimethylpiperidine, or a mixture thereof. In certain examples, the piperidine-based compound substituted with one or more alkyl groups may be 2-methylpiperidine or 2,6-dimethylpiperidine.

The second hydrogen storage body includes a compound including a cycloalkyl group and an N-heterocycloalkyl group.

For example, the N-heterocycloalkyl group may be a piperidine group, and the cycloalkyl group may be a cyclohexyl group. In addition, the cycloalkyl group may be substituted with alkyl group having 1 to 10 carbon atoms, for example, a methyl group, an ethyl group, a propyl group, an isopropyl group, a butyl group, an iso-butyl group, or a tert-butyl group. In this case, the compound including a substituted or unsubstituted cycloalkyl group and N-heterocycloalkyl group may be cyclohexyl piperidine, methylcyclohexyl piperidine, (methylcyclohexyl)methyl]piperidine, methyl decahydroquinoline, or a mixture thereof.

A compound including two or more N-heterocycloalkyl groups as the first hydrogen storage body is capable of dehydrogenation even at a temperature of 270° C. or less and exhibits a fast reaction rate and high conversion rate. However, the first by-product produced by dehydrogenation of the compound including two or more N-heterocycloalkyl groups is converted into a solid state, and thus there is a problem in that it is difficult to discharge.

Accordingly, when the compound including two or more N-heterocycloalkyl groups as the first hydrogen storage body is mixed with the compound including a substituted or unsubstituted cycloalkyl group and an N-heterocycloalkyl group as the second hydrogen storage body, the first by-product produced by dehydrogenating the first hydrogen storage body is dissolved in the second by-product in a liquid state produced by dehydrogenation of the second hydrogen storage body. As such, the mixture of the first by-product and the second by-product is present in a liquid state and thus may facilitate discharge. For example, when the second hydrogen storage body is cyclohexyl piperidine, it provides an advantageous, improved hydrogen conversion rate and a hydrogen storage amount.

The first hydrogen storage body and the second hydrogen storage body may be mixed in a mole ratio in a range of 1:0.5 to 1:2, in a range of 1:0.5 to 1:1.5, or in a range of 1:0.5 to 1:1. When the second hydrogen storage body is used in a mole ratio of less than 1:0.5, the mixed hydrogen storage bodies may be present in a solid state, but when used in a mole ratio of greater than 1:2, storage capacity and a dehydrogenation yield of the mixed hydrogen storage bodies may be deteriorated.

For example, when the first hydrogen storage body includes bipiperidine, the first by-product may include bipyridine. In addition, when the second hydrogen storage body includes cyclohexyl piperidine, the second by-product may include phenyl pyridine. When the second hydrogen storage body includes methylcyclohexyl piperidine, the second by-product may include tolyl pyridine. When the second hydrogen storage body includes methyl decahydroquinoline, the second by-product may include methyl quinoline. When the second hydrogen storage body includes (methylcyclohexyl)methyl]piperidine, the second by-product may include (tolylmethyl)pyridine.

The catalyst may include a carrier and an active metal supported thereon.

The carrier may include a metal oxide, carbon, or a mixture thereof.

The metal oxide carrier may include $Al_2O_3$, $CeO_2$, $SiO_2$, $TiO_2$, $SnO_2$, $Ta_2O_5$, $HfO_2$, $V_2O_5$, $Fe_2O_3$, $Cr_2O_3$, $MoO_3$, ZnO, $Pr_2O_3$, MgO, $ZrO_2$, $La_2O_3$, $WO_3$, or a mixture thereof.

For example, the metal oxide carrier may be a composite metal oxide carrier including alumina ($Al_2O_3$) and an additional metal oxide other than alumina.

The alumina may include $\delta$-$Al_2O_3$, $\gamma$-$Al_2O_3$, $\alpha$-$Al_2O_3$, $\eta$-$Al_2O_3$, $\delta$-$Al_2O_3$, $\kappa$-$Al_2O_3$, or a mixture thereof. The additional metal oxide may include $Pr_2O_3$, MgO, $ZrO_2$, $CeO_2$, $La_2O_3$, $SiO_2$, or a mixture thereof. For example, the composite metal oxide carrier may include $Pr_2O_3$—$Al_2O_3$, MgO—$Al_2O_3$, $ZrO_2$—$Al_2O_3$, $CeO_2$—$Al_2O_3$, $La_2O_3$—$Al_2O_3$, $SiO_2$—$Al_2O_3$, or a mixture thereof.

The composite metal oxide carrier may include the additional metal oxide in an amount of in a range of 1 wt. % to 50 wt. % or in a range of 1 wt. % to 20 wt. % based on the total weight of the composite metal oxide carrier. When the content of the additional metal oxide is less than 1 wt. %, the additional metal oxide may not sufficiently play its own role, but when greater than 50 wt. %, a surface area (specific surface area) and a pore size of the composite metal oxide may be reduced.

The active metal is a component supported on a carrier and has an activity that contributes to the improvement of the amount of hydrogen produced during the dehydrogenation reaction of the hydrogen storage body. For example, the active metal may include Pd, Pt, Ru, Sn, Mn, Zn, Mg, V, Ce, La, Y, Sm, Gd, Na, K, Cs, Rb, Ni, Rh, Ir, Co, Fe, Cr, Cu, or a mixture thereof.

The catalyst may include 0.1 wt. % to 10 wt. % or 0.5 wt. % to 5.0 wt. % of the active metal based on the total weight of the catalyst. If the content of the active metal is less than 0.1 wt. %, the amount of the active metal supported in the catalyst may decrease to deteriorate the activity of the catalyst, and if it exceeds 10 wt. %, a dispersion degree of the active metal may decrease.

In one example, the catalyst may further include an additional metal other than the active metal. The additional metal may further include rhodium (Rh), ruthenium (Ru), iridium (Ir), osmium (Os), tin (Sn), zinc (Zn), manganese (Mn), rhenium (Re), yttrium (Y), magnesium (Mg), vanadium (V), cerium (Ce), lanthanium (La), samarium (Sm), gadolinium (Gd), sodium (Na), potassium (K), cesium (Cs), rubidium (Rb), nickel (Ni), cobalt (Co), iron (Fe), chromium (Cr), copper (Cu), or a mixture thereof. The catalyst may include the additional metal other than the active metal in an amount in a range of 1 wt. % to 20 wt. % based on the total weight of the catalyst.

The catalyst may include the active metal in an amount in a range of 0.3 mole to 10 moles or in a range of 0.5 moles to 2 moles based on 100 moles of the reactant. When the active metal of the catalyst is included in an amount of less than 0.3 moles based on 100 moles of the reactant, the amount of the active metal is significantly smaller than that of the reactant, a reaction rate may be deteriorated, but when the active metal is included in an amount of greater than 10 moles, a total amount of the catalyst on which the active metal is supported is excessive based on that of the reactant, which may increase viscosity of the mixture and thereby cause difficulty in operating a reactor.

The dehydrogenation method may be performed by additionally mixing acid with the hydrogen storage bodies and then conducting a dehydrogenation reaction. When the hydrogen storage bodies are mixed with the acid, the hydrogen generation amount and volume storage at the beginning of the reaction may be improved.

The acid may include sulfuric acid, nitric acid, phosphoric acid, hydrochloric acid, boric acid, heteropolyacid, acetic acid, formic acid, malic acid, citric acid, tartaric acid, ascorbic acid, lactic acid, oxalic acid, succinic acid, tauric acid, or a mixture thereof, and the acid may include, for example, formic acid.

The acid may be mixed in an amount in a range of 0.001 mole to 1 mole or in a range of 0.01 mole to 0.5 mole based on 1 mole of the hydrogen storage body. If the content of the acid is less than 0.01 mole, an effect obtained by the addition of the acid may not be sufficiently exhibited and if it exceeds 1 mole, stirring becomes difficult due to salt formation and excess acid may corrode elements of the reaction system.

The dehydrogenation reaction may be performed at a temperature in a range of 200° C. to 300° C., 220° C. to 280° C., or 240° C. to 270° C. When the reaction temperature is less than 200° C., energy required for the reaction may not be appropriately supplied, lowering a reaction rate and a yield, or in case of the first hydrogen storage body including a portion of a compound including two or more N-heterocycloalkyl groups, the dehydrogenation reaction may not occur at all. When the reaction temperature is greater than 300° C., an undesired side reaction may occur.

The dehydrogenation reaction may occur at a pressure in a range of 1 bar to 5 bars or in a range of 3 bars to 5 bars. When the reaction pressure is less than 1 bar, because a boiling point of the reactant is lower than a reaction temperature thereof under the corresponding pressure, the reactant all may be gasified. When the reaction pressure is greater than 5 bars, because two reactions are all reversible reactions generating gas, a reverse hydrogenation reaction may be activated due to the high pressure.

FIG. 1 is a view schematically illustrating a hydrogen production system using a dehydrogenation method. Hereinafter, a hydrogen production system will be described in detail with reference to FIG. 1.

Referring to FIG. 1, the hydrogen production system includes a first hydrogen storage body supply unit 110, a second hydrogen storage body supply unit 120, and a dehydrogenation reaction unit 210.

The first hydrogen storage body supply unit 110 supplies the dehydrogenation reaction unit 210 with a first hydrogen storage body, for example, the first hydrogen storage body supply unit 110 may be configured as a storage tank storing the first hydrogen storage body, and a first pump 610 for supplying the first hydrogen storage body to the dehydrogenation reaction unit 210 may be included between the first hydrogen storage body supply unit 110 and the dehydrogenation reaction unit 210.

Similarly, the second hydrogen storage body supply unit 120 supplies the dehydrogenation reaction unit 210 with a second hydrogen storage body. For example, the second hydrogen storage body supply unit 120 may be configured as a storage tank for storing the second hydrogen storage body, and a second pump 620 for supplying the second hydrogen storage body to the dehydrogenation reaction unit 210 may be included between the second hydrogen storage body supply unit 120 and the dehydrogenation reaction unit 210.

When a liquid reaction proceeds in the dehydrogenation reaction unit 210, the hydrogen storage bodies in a liquid state may be injected into the dehydrogenation reaction unit 210 through an injector, wherein the hydrogen storage bodies may be preheated and then, injected into the dehydrogenation reaction unit 210. In addition, a pressure regulator for injecting the liquid hydrogen storage bodies into the dehydrogenation reaction unit 210 may be further included.

Alternatively, when a gaseous reaction proceeds in the dehydrogenation reaction unit 210, the liquid hydrogen storage bodies are gasified and then supplied to the dehydrogenation reaction unit 210 through a vaporizer (not shown). Herein, between the vaporizer and the dehydrogenation reaction unit 210, a hydrogen separation trap or a filter may be further included.

In addition, in the dehydrogenation reaction unit 210, the gas phase reaction and the aqueous phase reaction may proceed, respectively, and the system may be separately manufactured.

The dehydrogenation reaction unit 210 generates hydrogen by dehydrogenating the mixture of the first hydrogen storage body and the second hydrogen storage body. The dehydrogenation may be performed under the present of a catalyst, and the dehydrogenation reaction unit 210 may include the aforementioned catalyst.

The hydrogen production system may include, if necessary, a heat source 230 for supplying heat to the dehydrogenation reaction unit 210.

A type of the heat source 230 is not particularly limited and may include a hydrogen burner configured to generate heat by burning a portion of the produced hydrogen, an electric heating product composed of a heating wire, an electric heater, and the like, etc. In addition, heat generated from an exothermic power generator such as a fuel cell stack 500 using hydrogen produced in the dehydrogenation reaction unit 210, a hydrogen engine, or the like may be used.

In addition, the hydrogen production system may further include, if necessary, a heat exchange device (not shown).

When the first hydrogen storage body of the compound including two or more N-heterocycloalkyl groups is mixed with the second hydrogen storage body of the compound including a substituted or unsubstituted cycloalkyl group and an N-heterocycloalkyl group, the first by-product produced by dehydrogenating the first hydrogen storage body is dissolved in the second by-product produced from dehydrogenation of the second hydrogen storage body in a liquid state. As such, the mixture of the first by-product and the second by-product may be in a liquid state. Accordingly, the hydrogen production system may further include a by-product storage unit 220 for storing the mixture of the first by-product and the second by-product discharged from the dehydrogenation reaction unit 210.

Alternatively, when the dehydrogenation reaction in the dehydrogenation reaction unit 210 is a gas phase reaction, the hydrogen production system may further include a hydrogen separator 300 configured to separate hydrogen and dehydrogenated hydrides from the reaction products produced in the dehydrogenation reaction unit 210.

For example, in the case of a hydrogen storage body that reacts in a gaseous state, it goes through a hydrogen separator 300 to separate the produced hydrogen from the dehydrogenated hydrogen storage body, and in the case of a hydrogen storage body that reacts in a liquid state, a hydrogen separator 300 may be omitted.

Hydrogen produced from the dehydrogenation reaction unit 210 is transferred to the buffer tank 400. The buffer tank 400 receives and stores a predetermined amount of hydrogen gas.

A fuel cell stack 500 is disposed at the downstream of the buffer tank 400 and supplied with the hydrogen gas from the buffer tank 400. For example, the fuel cell stack 500 may receive the hydrogen gas through an intake port such as a valve and the like from the buffer tank 400.

The fuel cell stack 500 reacts the supplied hydrogen with oxygen to generate water and at the same time, to generate electrical energy. The water produced from the fuel cell stack 500 is discharged through an exhaust device or mechanism, such as a valve or the like.

The fuel cell stack 500 may be any device that converts the hydrogen gas into usable electrical energy, and for example, it may be a proton exchange membrane fuel cell (PEMFC), an alkaline fuel cell (AFC), a phosphoric acid fuel cell (PAFC), a molten carbonate salt fuel cell (MCFC), or a solid oxide fuel cell (SOFC), etc., but the present disclosure is not limited thereto.

For example, the fuel cell stack 500 may pass the generated electrical energy through a power converter such as a DC converter, an inverter, or a charge controller. The power converter may output a portion of the electrical energy to an electrical load through a load interconnect, and the other portion of the electrical energy may be sent back to the energy storage through a recharging interconnect. Another portion of the electrical energy may be used to supply power to a control unit.

The hydrogen production system may further include an additional pump, a trap or filter for separating hydrogen, or both, as needed, and may further include a control unit for controlling operation of the hydrogen production system.

The first pump 610 and the second pump 620 may be used to supply the liquid hydrogen storage body of the first hydrogen storage body supply unit 110 and the second hydrogen storage body supply unit 120 to the dehydrogenation reaction unit 210 as described above. In addition, the additional pump may be further included to supply the hydrogen gas produced in the dehydrogenation reaction unit 210 to the buffer tank 400 or the fuel cell stack 500.

The filter may filter the produced hydrogen gas and thus substantially remove unwanted particles not included in the hydrogen gas. The filter may be disposed between the dehydrogenation reaction unit 210, the hydrogen separator 300, the buffer tank 400, or the fuel cell stack 500 and particularly, between the buffer tank 400 and the fuel cell stack 500.

The control unit may be connected to a plurality of pumps, regulators, needle valves, check valves, ball valves, and multiway valves with a control line to control the operation.

Hereinafter, specific examples of the disclosure are presented. However, the examples described below are only for specifically illustrating or explaining the disclosure, and the scope of the disclosure is not limited thereto.

Reference Example 1

Figure 2:
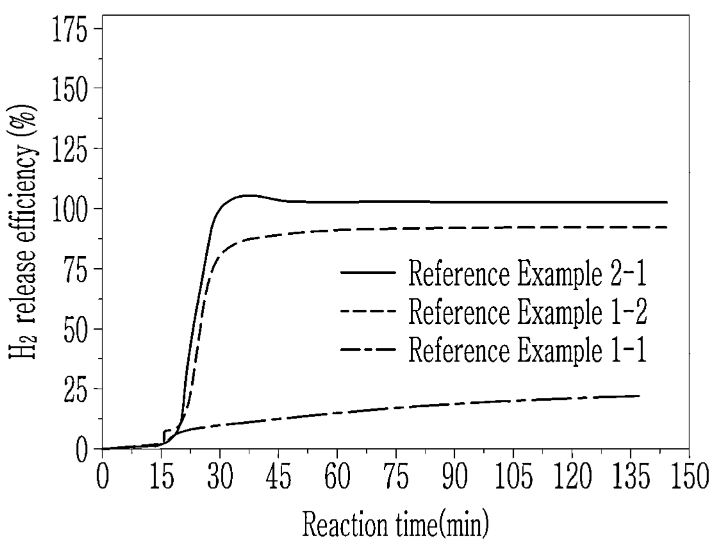
FIG. 2 is a graph showing the results of measuring hydrogen release efficiency while changing the type of bipiperidine in Reference Example 1.

Hydrogen release efficiency is measured by changing types of bipiperidine, and the results are shown in FIG. 2.

In Reference Example 1-1, a dehydrogenation reaction of 2,2'-bipiperidine proceeds in the presence of a $Pd/Al_2O_3$ (a content of Pd based on the total weight of catalyst: 5 wt. %) catalyst, in which a metal of the catalyst is 1 mole based on 100 moles of the reactant, at 200° C. under a pressure of 1 bar.

In Reference Example 1-2, a dehydrogenation reaction of the 2,2'-bipiperidine proceeds in the presence of a $Pd/Al_2O_3$ (a content of Pd based on the total weight of catalyst: 5 wt.

%) catalyst in which a metal of the catalyst is 1 mole based on 100 moles of the reactant at 270° C. under a pressure of 1 bar.

In Reference Example 2-1, a dehydrogenation reaction of 4,4'-bipiperidine proceeds in the presence of a $Pd/Al_2O_3$ (a content of Pd based on the total weight of catalyst: 5 wt. %) catalyst in which a metal of the catalyst is 1 mole based on 100 moles of the reactant at 270° C. under a pressure of 1 bar.

Referring to FIG. 2, both the 2,2'-bipiperidine and the 4,4'-bipiperidine exhibit a rapid reaction rate and a high conversion rate. However, the 2,2'-bipiperidine and the 4,4'-bipiperidine have a problem that a by-product of the dehydrogenation reaction is converted into a solid state.

Example 1

Figure 3:
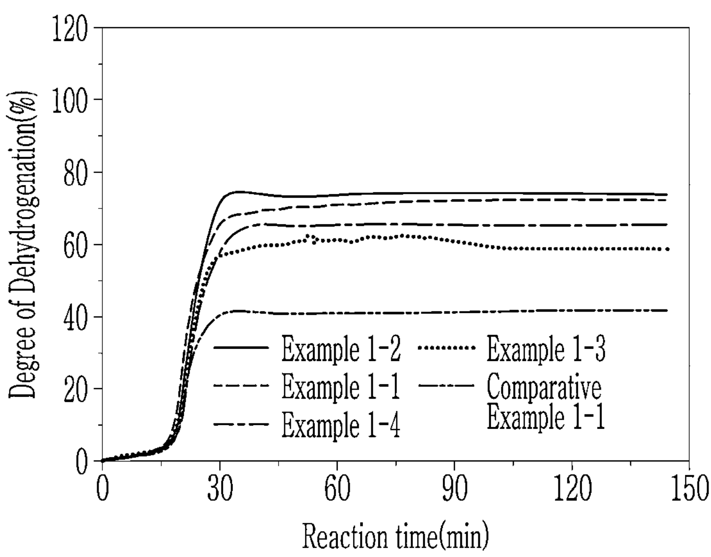
FIG. 3 is a graph showing the results of measuring the dehydrogenation activity while changing the type of the second hydrogen storage body in Example 1.

Dehydrogenation activity is measured by changing types of the second hydrogen storage body, and the results are shown in FIG. 3 and Table 1.

In Example 1-1, a dehydrogenation reaction of a reactant prepared by mixing 2,2'-bipiperidine and 2-cyclohexyl piperidine in a mole ratio of 1:2 proceeds in the presence of a $Pd/Al_2O_3$ (a content of Pd based on the total weight of catalyst: 5 wt. %) catalyst in which a metal of the catalyst is 1 mole based on 100 moles of the reactant at 270° C. under a pressure of 1 bar.

In Example 1-2, a dehydrogenation reaction of a reactant prepared by mixing 2,2'-bipiperidine and 2-p-methylcyclohexyl piperidine in a mole ratio of 1:2 proceeds in the presence of a $Pd/Al_2O_3$ (a content of Pd based on the total weight of catalyst: 5 wt. %) catalyst in which a metal of the catalyst is 1 mole based on 100 moles of the reactant at 270° C. under a pressure of 1 bar.

In Example 1-3, a dehydrogenation reaction of a reactant prepared by mixing 2,2'-bipiperidine and 2-methyl decahydroquinoline in a mole ratio of 1:2 proceeds in the presence of a $Pd/Al_2O_3$ (a content of Pd based on the total weight of catalyst: 5 wt. %) catalyst in which a metal of the catalyst is 1 mole based on 100 moles of the reactant at 270° C. under a pressure of 1 bar.

In Example 1-4, a dehydrogenation reaction of a reactant prepared by mixing 2,2'-bipiperidine and [(2-methylcyclohexyl)methyl]piperidine in a mole ratio of 1:2 proceeds in the presence of a $Pd/Al_2O_3$ (a content of Pd based on the total weight of catalyst: 5 wt. %) catalyst in which a metal of the catalyst is 1 mole based on 100 moles of the reactant at 270° C. under a pressure of 1 bar.

In Comparative Example 1-1, a dehydrogenation reaction of a reactant prepared by mixing 2,2'-bipiperidine and 1-(cyclohexylmethyl)-2-methylcyclohexane in a mole ratio of 1:2 proceeds in the presence of a $Pd/Al_2O_3$ (a content of Pd based on the total weight of catalyst: 5 wt. %) catalyst in which a metal of the catalyst is 1 mole based on 100 moles of the reactant at 270° C. under a pressure of 1 bar.

TABLE 1

| | First hydrogen storage body | Second hydrogen storage body | Conversion rate (%) | Hydrogen storage amount (wt. %) |
|---|---|---|---|---|
| Reference Example 1-2 | 2,2'-bipiperidine | none | 100 | 7.19 |
| Example 1-1 | 2,2'-bipiperidine | 2-cyclohexyl piperidine | 73.27 | 7.23 |
| Example 1-2 | 2,2'-bipiperidine | 2-p-methylcyclohexyl piperidine | 70.19 | 6.67 |
| Example 1-3 | 2,2'-bipiperidine | 2-methyl decahydroquinoline | 63.96 | 6.58 |
| Example 1-4 | 2,2'-bipiperidine | [(2-methylcyclohexyl)methyl]piperidine | 62.10 | 6.19 |
| Comparative Example 1-1 | 2,2'-bipiperidine | 1-(cyclohexylmethyl)-2-methylcyclohexane | 18.03 | 6.22 |

Referring to FIG. 3 and Table 1, after performing a dehydrogenation reaction by selecting 5 types of piperidine-based liquid hydrogen storage bodies as a solvent and mixing each of them with 2,2'-bipiperidine, bipyridine produced there is well dissolved, and all maintained in a liquid state.

In addition, because an N-heterocycloalkyl group of the solvents has excellent adsorption, a homo-cycloalkyl group is not participated in the reaction, reducing a conversion rate, and accordingly, 2-cyclohexyl piperidine is excellent as a solvent in terms of a conversion rate and a hydrogen storage amount.

Example 2

Figure 4:
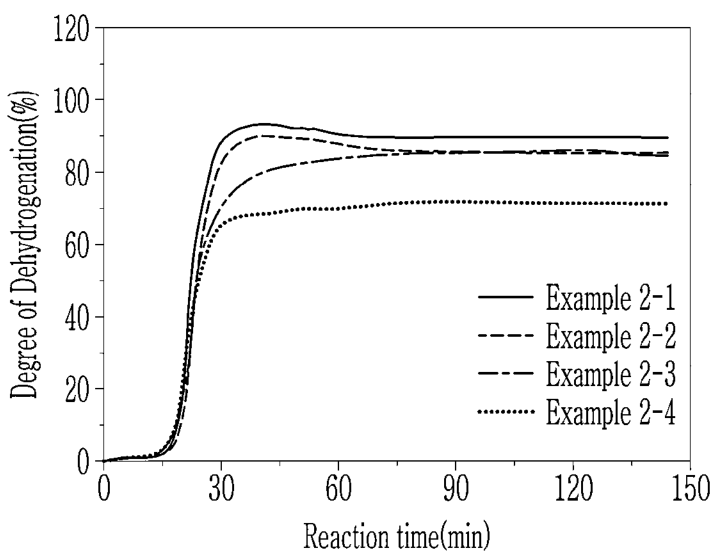
FIG. 4 is a graph showing the results of measuring the dehydrogenation activity while changing the mixing ratio of the first hydrogen storage body and the second hydrogen storage body in Example 2.

Dehydrogenation activity is measured by changing a mixing ratio of the first hydrogen storage body and the second hydrogen storage body, and the results are shown in FIG. 4 and Table 2.

In Example 2-1, a dehydrogenation reaction of a reactant prepared by mixing 2,2'-bipiperidine and 2-cyclohexyl piperidine in a mole ratio of 1:0.5 proceeds in the presence of a $Pd/Al_2O_3$ (a content of Pd based on the total weight of catalyst: 5 wt. %) catalyst in which a metal of the catalyst is 1 mole based on 100 moles of the reactant at 270° C. under a pressure of 1 bar.

In Example 2-2, a dehydrogenation reaction of a reactant prepared by mixing 2,2'-bipiperidine and 2-cyclohexyl piperidine in a mole ratio of 1:0.67 proceeds in the presence of a $Pd/Al_2O_3$ (a content of Pd based on the total weight of catalyst: 5 wt. %) catalyst in which a metal of the catalyst is 1 mole based on 100 moles of the reactant at 270° C. under a pressure of 1 bar.

In Example 2-3, a dehydrogenation reaction of a reactant prepared by mixing 2,2'-bipiperidine and 2-cyclohexyl piperidine in a mole ratio of 1:1 proceeds in the presence of a $Pd/Al_2O_3$ (a content of Pd based on the total weight of catalyst: 5 wt. %) catalyst in which a metal of the catalyst is 1 mole based on 100 moles of the reactant at 270° C. under a pressure of 1 bar.

In Example 2-4, a dehydrogenation reaction of a reactant prepared by mixing 2,2'-bipiperidine and 2-cyclohexyl piperidine in a mole ratio of 1:2 proceeds in the presence of a $Pd/Al_2O_3$ (a content of Pd based on the total weight of catalyst: 5 wt. %) catalyst in which a metal of the catalyst is 1 mole based on 100 moles of the reactant at 270° C. under a pressure of 1 bar.

TABLE 2

| | First hydrogen storage body | Second hydrogen storage body | Mixing ratio (mole ratio) | Conversion rate (%) |
|---|---|---|---|---|
| Example 2-1 | 2,2'-bipiperidine | 2-cyclohexyl piperidine | 1:0.5 | 88.72 |
| Example 2-2 | 2,2'-bipiperidine | 2-cyclohexyl piperidine | 1:0.67 | 83.49 |
| Example 2-3 | 2,2'-bipiperidine | 2-cyclohexyl piperidine | 1:1 | 77.80 |
| Example 2-4 | 2,2'-bipiperidine | 2-cyclohexyl piperidine | 1:2 | 73.27 |

Referring to FIG. 3 and Table 2, when the 2,2'-bipiperidine and the 2-cyclohexyl piperidine are used in a mole ratio of 1:0.5, because a homo-cycloalkyl group of the 2-cyclohexyl piperidine has a non-reaction problem, as the 2,2'-bipiperidine is included in a higher ratio, a conversion rate is increased. When dehydrogenated alone under the same conditions, the 2,2'-bipiperidine maintains a conversion rate of 100% before and after mixed with the 2-cyclohexyl piperidine, but the 2-cyclohexyl piperidine exhibits a conversion rate decreased from 70% to 50%.

Reference Example 2

Figure 5:
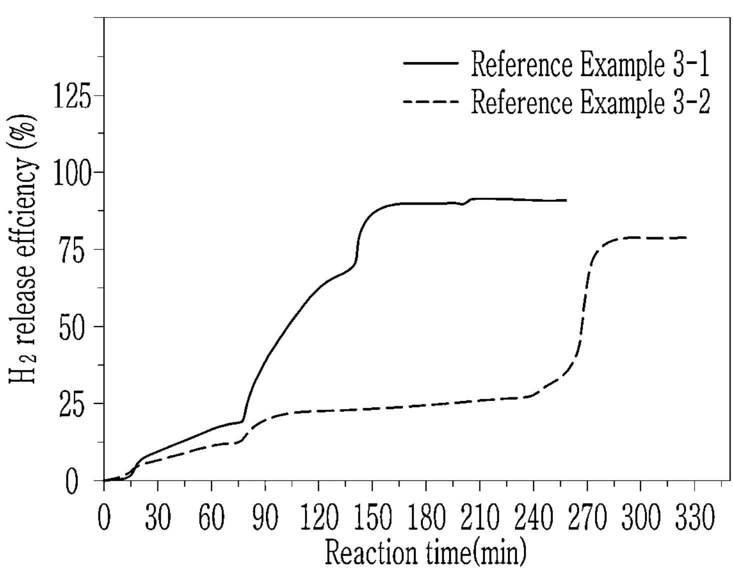
FIG. 5 is a graph showing the results of measuring the hydrogen release efficiency of bipiperidine while changing the temperature in Reference Example 2.

Hydrogen release efficiency is measured by changing a temperature, and the results are shown in FIG. 5.

In Reference Example 3-1, a dehydrogenation reaction of 2,2'-bipiperidine proceeds in the presence of a $Pd/Al_2O_3$ (a content of Pd based on the total weight of catalyst: 5 wt. %) catalyst in which a metal of the catalyst is 1 mole based on 100 moles of the reactant under a pressure of 1 bar by increasing a temperature by 20° C.

In Reference Example 3-2, a dehydrogenation reaction of 4,4'-bipiperidine proceeds in the presence of a $Pd/Al_2O_3$ (a content of Pd based on the total weight of catalyst: 5 wt. %) catalyst in which a metal of the catalyst is 1 mole based on 100 moles of the reactant under a pressure of 1 bar by increasing a temperature by 20° C.

Referring to FIG. 5, the 4,4'-bipiperidine undergoes a rapid reaction at 270° C. or higher, whereas as for the 2,2'-bipiperidine, a dehydrogenation reaction may proceed even at 240° C.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

110: first hydrogen storage body supply unit
120: second hydrogen storage body supply unit
210: dehydrogenation reaction unit
220: by-product storage unit
230: heat source
300: hydrogen separator
400: buffer tank
500: fuel cell stack
610: first pump
620: second pump

What is claimed is:

1. A dehydrogenation method comprising:

subjecting a first hydrogen storage body and a second hydrogen storage body to a dehydrogenation reaction in a presence of a catalyst to produce hydrogen, wherein the first hydrogen storage body comprises a compound having two or more N-heterocycloalkyl groups, wherein the second hydrogen storage body comprises a compound having a substituted or unsubstituted cycloalkyl group and an N-heterocycloalkyl group, and wherein a mixture of a first by-product produced by dehydrogenating the first hydrogen storage body and a second by-product produced by dehydrogenating the second hydrogen storage body is in a liquid state.

2. The dehydrogenation method of claim 1, wherein an N-heterocycloalkyl group of the two or more N-heterocycloalkyl groups of the first hydrogen storage body is a piperidine group and/or the N-heterocycloalkyl group of the second hydrogen storage body is a piperidine group, and wherein the substituted or unsubstituted cycloalkyl group of the second hydrogen storage body is a cyclohexyl group.

3. The dehydrogenation method of claim 1, wherein the compound of the first hydrogen storage body comprises bipiperidine.

4. The dehydrogenation method of claim 1, wherein the compound of the second hydrogen storage body comprises cyclohexyl piperidine, methylcyclohexyl piperidine, [(methylcyclohexyl)methyl]piperidine, methyl decahydroquinoline, or a mixture thereof.

5. The dehydrogenation method of claim 1, wherein the compounds of the first hydrogen storage body and the second hydrogen storage body are mixed in a mole ratio in a range of 1:0.5 to 1:2.

6. The dehydrogenation method of claim 1, wherein the catalyst comprises a carrier and an active metal supported on the carrier.

7. The dehydrogenation method of claim 6, wherein the active metal is in a range of 0.1 wt. % to 10 wt. % based on a total weight of the catalyst.

8. The dehydrogenation method of claim 6, wherein the active metal comprises Pd, Pt, Ru, Sn, Mn, Zn, Mg, V, Ce, La, Y, Sm, Gd, Na, K, Cs, Rb, Ni, Rh, Ir, Co, Fe, Cr, Cu, or a mixture thereof.

9. The dehydrogenation method of claim 6, wherein the catalyst comprises an additional metal other than the active metal in a range of 1 wt. % to 20 wt. % based on the total weight of the catalyst.

10. The dehydrogenation method of claim 6, wherein the carrier comprises $Al_2O_3$, $CeO_2$, $SiO_2$, $TiO_2$, $SnO_2$, $Ta_2O_5$, $HfO_2$, $V_2O_5$, $Fe_2O_3$, $Cr_2O_3$, $MoO_3$, ZnO, $Pr_2O_3$, MgO, $ZrO_2$, $La_2O_3$, $WO_3$, carbon, or a mixture thereof.

11. The dehydrogenation method of claim 1, wherein the first by-product is dissolved in the second by-product in the liquid state.

12. The dehydrogenation method of claim 1, wherein the first by-product comprises bipyridine, and wherein the second by-product comprises phenylpyridine, tolylpyridine, methylquinoline, (tolylmethyl)pyridine, or a mixture thereof.

13. The dehydrogenation method of claim 1, wherein the dehydrogenation reaction is performed at a temperature in a range of 200° C. to 300° C. and at a pressure in a range of 1 bar to 5 bars.

* * * * *